(12) United States Patent
Chen et al.

(10) Patent No.: US 12,321,770 B2
(45) Date of Patent: Jun. 3, 2025

(54) METHOD, DEVICE AND COMPUTER PROGRAM PRODUCT FOR RESOURCE SCHEDULING

(71) Applicant: EMC IP Holding Company LLC, Hopkinton, MA (US)

(72) Inventors: Tao Chen, Beijing (CN); Bing Liu, Tianjin (CN); Shuguang Gong, Beijing (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 644 days.

(21) Appl. No.: 17/490,174

(22) Filed: Sep. 30, 2021

(65) Prior Publication Data
US 2022/0405114 A1    Dec. 22, 2022

(30) Foreign Application Priority Data

Jun. 18, 2021   (CN) .......................... 202110680992.7

(51) Int. Cl.
*G06F 9/455*    (2018.01)
*G06F 9/50*     (2006.01)
*G06F 12/02*    (2006.01)

(52) U.S. Cl.
CPC ........ *G06F 9/45558* (2013.01); *G06F 9/5016* (2013.01); *G06F 9/5038* (2013.01); *G06F 9/5077* (2013.01); *G06F 12/0253* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 2019/0138361 A1* | 5/2019 | Bernat | G06F 9/485 |
| 2019/0229990 A1* | 7/2019 | Patel | H04L 41/40 |
| 2019/0294473 A1* | 9/2019 | Martin | G06F 11/3495 |
| 2019/0347123 A1* | 11/2019 | Wu | H04L 41/083 |
| 2021/0382737 A1* | 12/2021 | Cheng | G06F 21/604 |
| 2022/0214902 A1* | 7/2022 | Zhao | G06F 9/4856 |
| 2022/0276914 A1* | 9/2022 | Kundu | G06F 9/4881 |

* cited by examiner

*Primary Examiner* — Wynuel S Aquino
(74) *Attorney, Agent, or Firm* — Chamberlain, Hrdlicka, White, Williams & Aughtry; Aly Z. Dossa

(57) ABSTRACT

A method, a device, and a computer program product for resource scheduling is disclosed. The method includes determining a job initiated by a virtual machine. The job requests to invoke at least one virtual function in a set of virtual functions associated with the virtual machine and each virtual function in the set of virtual functions is configured to utilize an accelerator resource to provide a single type of acceleration service. The method further includes determining, based on a job type of the job, a first accelerator resource allocated to the at least one virtual function. The accelerator resources required by the virtual functions invoked by the job may then be guaranteed, improving the execution efficiency of the job.

12 Claims, 5 Drawing Sheets

METHOD, DEVICE AND COMPUTER PROGRAM PRODUCT FOR RESOURCE SCHEDULING

CROSS REFERENCE TO RELATED APPLICATIONS

This application claims priority under 35 U.S.C. § 119 to Chinese Patent Application No. 202110680992.7, filed on Jun. 18, 2021. The contents of Chinese Patent Application No. 202110680992.7 are incorporated by reference in its entirety.

TECHNICAL FIELD

Embodiments of the present disclosure relate to the field of computers and, more particularly, to a method, a device, and a computer program product for resource scheduling.

BACKGROUND

Accelerator resources are some processing resources with acceleration functions, for example, coprocessors, which are capable of assisting a central processing unit (CPU) in performing some acceleration tasks. A coprocessor is a chip that is capable of relieving a system CPU of a specific processing task. For example, a math coprocessor can perform numerical processing, and a graphics coprocessor (GPU) can handle video drawing. A GPU is a core processor dedicated to graphics or images, and its main task is to accelerate graphics processing speed.

A Quick Assist Technology (QAT) card is also a coprocessor that can be used to accelerate computationally intensive tasks, such as compression and encryption. By adding a QAT card to a system, applications can run faster and the performance and efficiency of the system can be improved. Functions provided by the QAT card may include symmetric encryption, identity authentication, asymmetric encryption, digital signature, public key encryption, lossless data compression, and the like.

SUMMARY

Embodiments of the present disclosure provide a scheme for scheduling resources.

According to an aspect of the present disclosure, a method for resource scheduling is proposed. This method includes: determining a job initiated by a virtual machine, wherein the job requests to invoke at least one virtual function in a set of virtual functions associated with the virtual machine, and each virtual function in the set of virtual functions is configured to utilize an accelerator resource to provide a single type of acceleration service; and determining, based on a job type of the job, a first accelerator resource allocated to the at least one virtual function.

According to another aspect of the present disclosure, an electronic device is proposed. The device includes: at least one processing unit; and at least one memory coupled to the at least one processing unit and storing instructions for execution by the at least one processing unit, wherein the instructions, when executed by the at least one processing unit, cause the device to perform actions including: determining a job initiated by a virtual machine, wherein the job requests to invoke at least one virtual function in a set of virtual functions associated with the virtual machine, and each virtual function in the set of virtual functions is configured to utilize an accelerator resource to provide a single type of acceleration service; and determining, based on a job type of the job, a first accelerator resource allocated to the at least one virtual function.

In another aspect of the present disclosure, a computer program product is provided. The computer program product is stored in a non-transitory computer storage medium and includes machine-executable instructions that, when run in a device, cause the device to perform any step of the method described according to the first aspect of the present disclosure.

The Summary is provided to introduce the selection of concepts in a simplified form, which will be further described in the Detailed Description below. The Summary is neither intended to identify key features or essential features of the present disclosure, nor intended to limit the scope of the present disclosure.

BRIEF DESCRIPTION OF THE DRAWINGS

The above and other objectives, features, and advantages of the present disclosure will become more apparent by describing example embodiments of the present disclosure in more detail with reference to the accompanying drawings. In the example embodiments of the present disclosure, the same reference numerals generally represent the same members.

DETAILED DESCRIPTION

Preferred embodiments of the present disclosure will be described in more detail below with reference to the accompanying drawings. While the preferred embodiments of the present disclosure are shown in the accompanying drawings, it should be understood that the present disclosure can be implemented in various forms without being limited to the embodiments set forth herein. Rather, these embodiments are provided to make the present disclosure more thorough and complete and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may be included below.

As mentioned earlier, accelerator technologies such as QAT technology have been widely applied in various systems, for example, storage systems with de-duplication applications. Such systems are often built on virtualization technologies. Then, how to deploy and utilize accelerator resources in a virtualized environment becomes an important issue.

Figure 1:
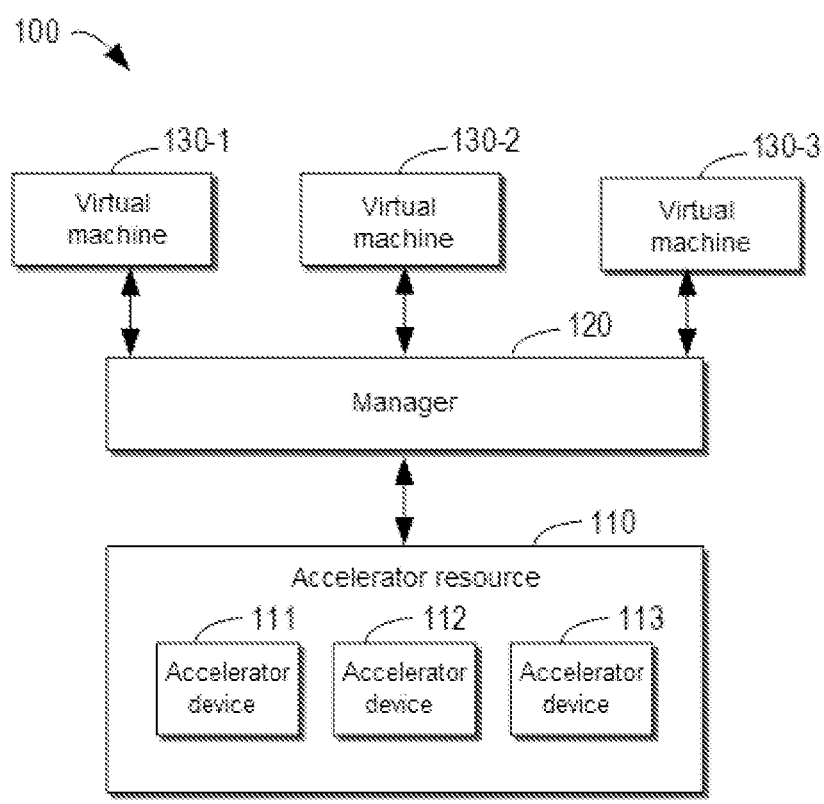
FIG. 1 illustrates a schematic diagram of an example system in which one or more embodiments of the present disclosure can be implemented.

FIG. 1 illustrates a schematic diagram of a portion of example system 100 in which one or more embodiments of the present disclosure may be implemented. As shown in FIG. 1, system 100 includes accelerator resource 110, manager 120, and one or more virtual machines. FIG. 1 illustrates multiple virtual machines 130-1, 130-2, and 130-3. It should be understood that storage system 100 may also include one or more other components not shown.

Accelerator resource 110 may include one or more accelerator devices, for example, accelerator devices 111-113 illustrated in FIG. 1. Accelerator resource 110 may function as a coprocessor for storage system 100 to relieve some processing tasks for a general purpose processor (not shown). Accelerator resource 110 may implement acceleration operations for certain specific functions and computations and may achieve higher execution efficiency than the general purpose processor. In one or more embodiments, accelerator resource 110 may be one or more QAT cards that may perform acceleration for encryption and/or decryption of data, as well as acceleration of compression and/or decompression of data. It should be understood that while in some embodiments of the present disclosure, QAT cards are taken as examples of accelerator resources, the accelerator resources may also be other hardware processing devices that have acceleration functions for specific tasks (such as encryption and decryption, compression, and matrix computation).

As shown in FIG. 1, storage system 100 implements a virtualized environment and includes virtual machines 130-1, 130-2, and 130-3. For ease of description, hereinafter, virtual machines 130-1, 130-2, and 130-3 may also be referred to collectively as virtual machines 130. Applications can be run on virtual machines 130 to perform various tasks of system 100.

Virtual machines 130 may initiate multiple types of jobs. These different types of jobs may request the use of accelerator resource 110.

Manager 120 may be implemented by a software module (e.g., a hypervisor) to support the use of accelerator resource 110 in a virtualized environment.

In a conventional scheme, accelerator resources may be bound to virtual machines. A job initiated by a particular virtual machine may utilize only the accelerator resources pre-allocated to that virtual machine, regardless of whether there are other available accelerator resources in the system. The binding of accelerator resources to virtual machines is usually implemented through pass-through technology or SR-IOV (Single-Root Input/Output Virtualization). In the pass-through technology, virtual machines may be bound directly to one or more physical accelerator devices.

Figure 2:
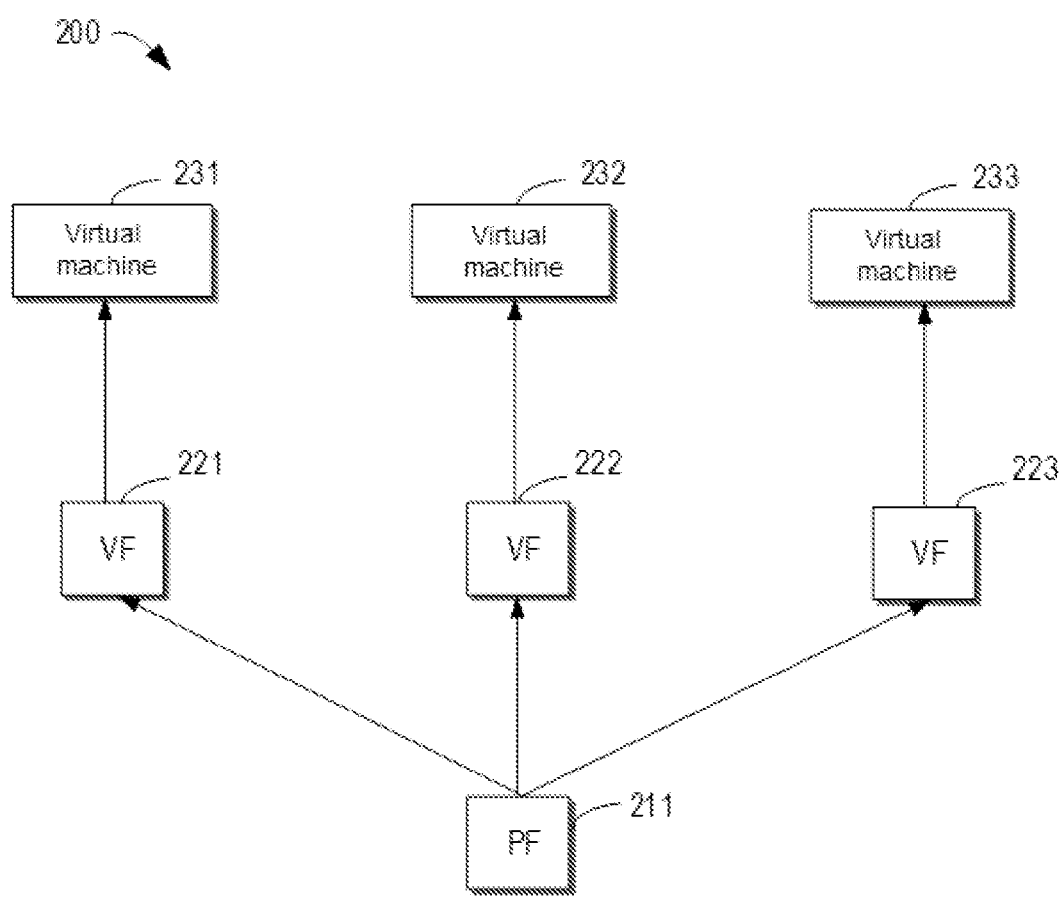
FIG. 2 illustrates a schematic block diagram of a conventional scheme for utilizing accelerator resources in accordance with one or more embodiments disclosed herein.

SR-IOV is a commonly used virtualization support technology. Binding based on SR-IOV will be described below with reference to FIG. 2. FIG. 2 illustrates schematic block diagram 200 of a conventional scheme in which accelerator resources are used. Physical function PF 211 shown in FIG. 2 may be considered as a physical accelerator device, e.g., a QAT card. PF 211 may be virtualized as virtual functions VF 221-223.

In the conventional scheme, as shown in FIG. 2, a single virtual function (VF) would be bound to a corresponding virtual machine to provide that virtual machine with various types of acceleration services it needs to execute jobs. For example, VF 221 is bound to virtual machine 231, VF 222 is bound to virtual machine 232, and VF 223 is bound to virtual machine 233.

Taking a data protection system as an example, such VFs are used to provide corresponding virtual machines with multiple types of acceleration services, such as a compression service, an encryption service, a decryption service, a hashing service, or a decompression service. In such a design, internal resources cannot be efficiently allocated among multiple services, and thus the performance of individual services cannot be guaranteed. This in turn will cause a decrease in the job execution efficiency of the virtual machine.

To this end, embodiments of the present disclosure provide a resource scheduling scheme to eliminate at least one or more of the above deficiencies. In one or more embodiments of the present disclosure, a job initiated by a virtual machine is determined, wherein the job requests to invoke at least one virtual function in a set of virtual functions associated with the virtual machine, and each virtual function in the set of virtual functions is configured to utilize an accelerator resource to provide a single type of acceleration service. Further, a first accelerator resource allocated to the at least one virtual function is determined based on a job type of the job.

In the resource scheduling scheme proposed in embodiments of the present disclosure, a single virtual function will be used to provide a single type of acceleration service to a virtual machine. In this manner, the accelerator resources allocated to each virtual function can be guaranteed, allowing the performance of the acceleration service to be guaranteed, thereby improving the execution efficiency of jobs.

The basic principles and several example implementations of the present disclosure are described below with reference to FIGS. 3 to 6. It should be understood that these example embodiments are given only to enable those skilled in the art to better understand and thus implement the embodiments of the present disclosure, and are not intended to limit the scope of the present disclosure in any way.

Figure 3:
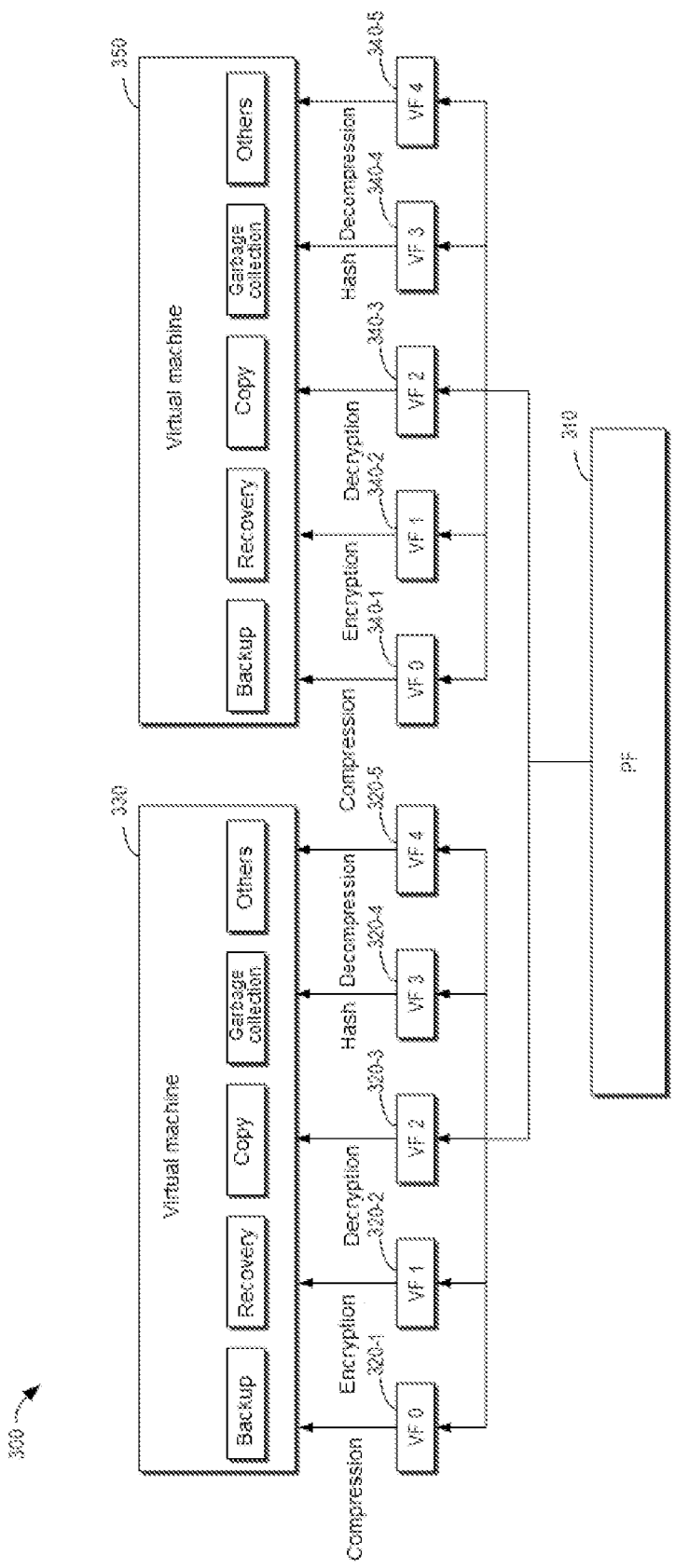
FIG. 3 illustrates a schematic block diagram of the provision of virtual services according to one or more embodiments of the present disclosure.

FIG. 3 illustrates schematic block diagram 300 of the provision of virtual services according to one or more embodiments of the present disclosure. As shown in FIG. 3, physical function (PF) 310 may be virtualized into multiple virtual functions (VFs). For example, virtual functions (VFs) 320-1 to 320-5 are bound to virtual machine 330 to provide corresponding acceleration services to virtual machine 330; and virtual functions (VFs) 340-1 to 340-5 are bound to virtual machine 350 to provide corresponding acceleration services to virtual machine 350.

Unlike the conventional approach in which a single virtual function provides multiple acceleration services, in embodiments of the present disclosure, a VF will be configured to provide a single type of acceleration service. Taking data protection as an example, as shown in FIG. 3, VF 320-1 is configured to provide only a compression service, VF 320-2 is configured to provide only an encryption service, VF 320-3 is configured to provide only a decryption service, VF 320-4 is configured to provide only a hashing service, and VF 320-5 is configured to provide only a decompression service.

Based on this approach, when virtual machine 330 executes a different type of job, the corresponding VF may be invoked for supporting the execution of that job. For example, when virtual machine 330 executes a data backup job, VF 320-1 may be invoked to provide a compression service, VF 320-4 may be invoked to provide a hashing service, and VF 320-5 may be invoked to provide a decompression service.

Because a single VF is configured to perform a single type of service, one or more embodiments of the present disclosure can guarantee the performance of each VF, thereby improving the efficiency of the jobs executed by the virtual machine.

Considering that different types of jobs may have different priorities and that different types of jobs may have different levels of demand for different services, a static accelerator resource allocation scheme will therefore not guarantee the execution efficiency of jobs.

One or more embodiments of the present disclosure may determine, according to the types of jobs executed by different virtual machines, a scheme for scheduling accelerator resources among the different virtual machines, thereby enabling dynamic scheduling of accelerator resources among the different virtual machines.

In some examples, system 100 can determine the corresponding scheduling policy based on the types of jobs executed by the virtual machines. Take FIG. 3 as an example, virtual machine 330 performs, for example, a "data backup" job, while virtual machine 350 performs a "garbage collection" job. In some embodiments, system 100 can, for example, determine that the "data backup" job has a higher priority than the "garbage collection" job, and in turn can allocate more accelerator resources to virtual machine 330 and fewer accelerator resources to virtual machine 350.

For example, if the total available accelerator resources are 150 Gbps, system 100 can allocate 100 Gbps of accelerator resources to virtual machine 330 and the remaining 50 Gbps of accelerator resources to virtual machine 350. In this way, the execution performance of jobs with higher priorities can be guaranteed, thereby improving the overall efficiency of the system.

In some embodiments, the priorities of different job types may be pre-configured by an administrator. As an example, the administrator may specify the priorities corresponding to different job types in different scenarios. For example, the administrator may specify that "data backup" has a higher priority than "garbage collection" in a first scenario, while "data backup" has a lower priority than "garbage collection" in a second scenario.

Alternatively or additionally, resource scheduling rules associated with different job types may, for example, also be pre-configured by the administrator. For example, the administrator can specify a 2:1 ratio of accelerator resource allocation corresponding to "data backup" to "garbage collection" in the first scenario.

It should be understood that while the accelerator resource scheduling among different virtual machines is determined above in conjunction with a single job type, embodiments of the present disclosure may also be applied to scenarios where virtual machines perform jobs of multiple job types simultaneously.

For example, if virtual machine 330-1 performs both "data backup" and "garbage collection" jobs simultaneously, and virtual machine 330-2 performs both "data recovery" and "garbage collection" jobs simultaneously, the system can determine that virtual machine 330-1 has a lower priority than virtual machine 330-2 based on predetermined prioritization rules. Thus, virtual machine 330-2 can be allocated more accelerator resources than virtual machine 330-1.

It should be understood that the above specific prioritization rules and resource allocation rules are only examples, and the present disclosure is not intended to be limiting in this regard.

One or more embodiments of the present disclosure may determine, according to the types of jobs executed by virtual machines, a scheme for scheduling accelerator resources among different VFs, thereby achieving dynamic scheduling of accelerator resources among the different VFs.

Continuing with the example of FIG. 3, if virtual machine 330 executes a "data backup" job, virtual machine 330 needs to invoke VF 320-1 to obtain a compression service, invoke VF 320-4 to obtain a hashing service, and invoke VF 320-5 to obtain a decompression service.

Considering that different job types have different demands for different acceleration services, system 100 may also determine a policy for scheduling resources among VF 320-1, VF 320-4, and VF 320-5 according to the job types.

As an example, because the "data backup" job needs to perform more hashing, if the total accelerator resources allocated to virtual machine 100 are 100 Gbps (e.g., allocation can be determined based on the dynamic scheduling policy discussed above, or determined in other appropriate ways), the system may further determine that VF 320-4 can be allocated 50 Gbps accelerator resources, and VF 320-1 and VF 320-5 can each be allocated 25 Gbps accelerator resources. In this way, it is possible to ensure that more fine-grained scheduling of accelerator resources is achieved, thereby improving the efficiency of the system.

In one or more embodiments, resource allocation rules among different virtual functions may, for example, be pre-configured by the administrator. As an example, the administrator may designate specific virtual function allocation rules for different job types in different scenarios.

In one or more embodiments, the resource allocation rules among different virtual functions may also be determined automatically through machine learning, for example. As an example, an appropriate machine learning model may be used to learn the resource allocation rules corresponding to different scenarios and different job types. For example, in a training stage, features corresponding to scenarios and features related to job types may be input, and resource allocation rules constructed by experts may be used as truth values for training, for example, to train this machine learning model so that it can output recommended resource allocation rules based on the scenarios and job types.

Alternatively, the resource allocation rules among different virtual functions may also be determined, for example, by other appropriate debugging methods. For example, the administrator may, for example, determine, through performance testing, which allocation rules can result in better execution performance.

It should be understood that the above specific resource allocation rules are examples only and the present disclosure is not intended to be limiting in this regard.

It should be understood that the data protection scenario shown in FIG. 3 and the specific services performed by the VFs are only examples and that the embodiments of the present disclosure may also be applied to any other appropriate type of scenario.

Figure 4:
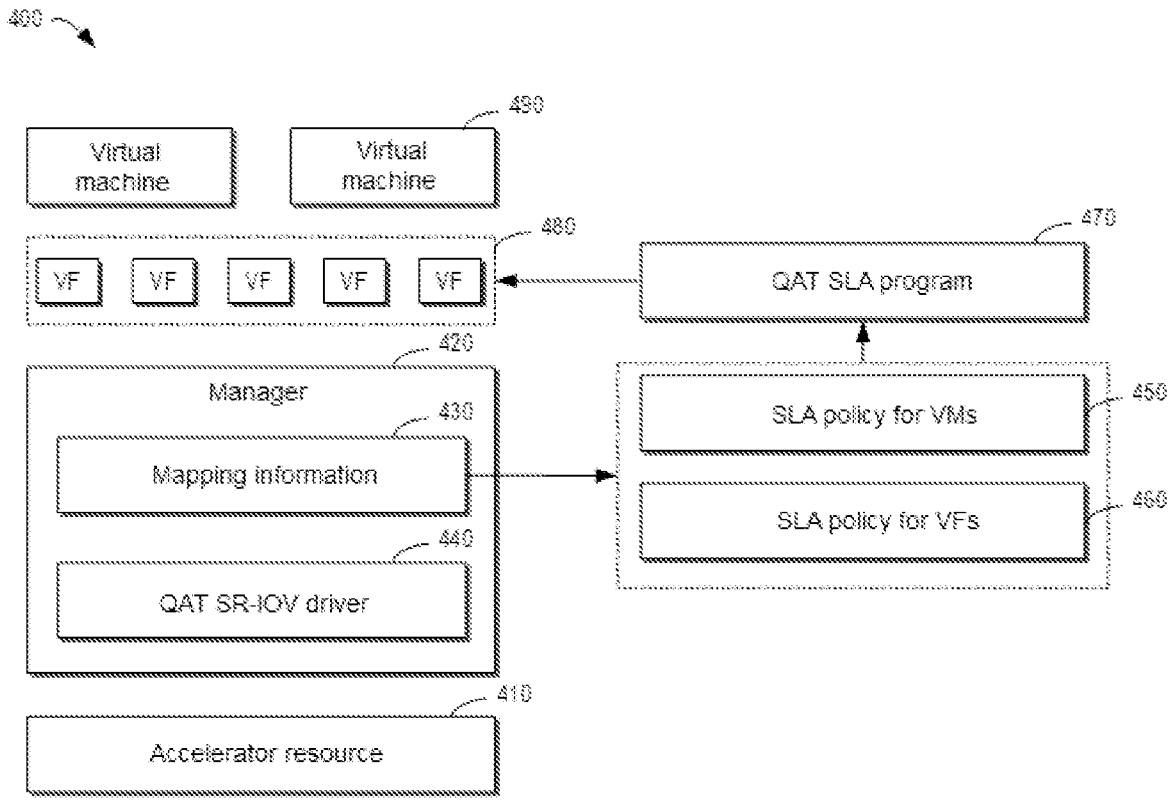
FIG. 4 illustrates a schematic block diagram of an acceleration system according to one or more embodiments of the present disclosure.

One or more embodiments of the present disclosure may also utilize the service level agreement (SLA) to achieve dynamic scheduling of accelerator resources. FIG. 4 illustrates a schematic block diagram of an acceleration system according to one or more embodiments of the present disclosure. As shown in FIG. 4, acceleration system 400 may include accelerator resource 410, manager 420, virtual function 480, and virtual machine 490, and manager 420 may include, for example, QAT SR-IOV driver 440.

Using manager 420 to directly manage accelerator resource scheduling may introduce limitations to the scalability of the scheme. As shown in FIG. 4, acceleration system 400 also includes QTA SLA program 470 for managing accelerator resource allocation to virtual function 480.

QTA SLA program 470 is the capability in the QAT software to enable rate control by managing the amount of resources to a specific virtual function. By using the SLA to achieve accelerator resource allocation, the embodiments of the present disclosure are capable of disregarding different implementations of manager 420 (e.g., a hypervisor), thereby improving better scalability.

As shown in FIG. 4, an administrator may, for example, configure mapping information 430 via manager 420 to indicate a binding relationship between virtual machine 490 and corresponding virtual function 480. Further, system 400, for example, also allows the administrator to configure corresponding SLA policies, and such SLA policies may, for example, include SLA policy 450 for the virtual machine as discussed above to, for example, perform accelerator resource allocation among virtual machines based on the job types of different virtual machines. The SLA policy may also include, for example, SLA policy 460 for different virtual functions to, for example, perform the accelerator resource allocation among different virtual functions based on different job types. For example, a corresponding amount of accelerator resources can be allocated to each VF by allocating a predetermined number of SLA units, wherein each SLA unit may, for example, correspond to 1 Gbps.

Figure 5:
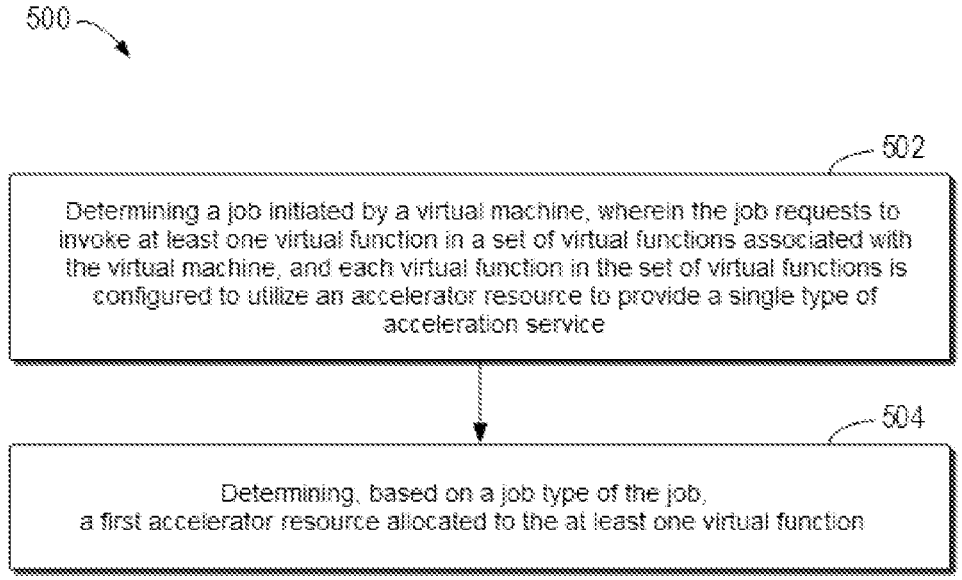
FIG. 5 illustrates a flow chart of a resource usage method according to one or more embodiments of the present disclosure.

FIG. 5 illustrates a flow chart of example process 500 according to one or more embodiments of the present disclosure. For ease of description, it is described below in conjunction with system 100 shown in FIG. 1. As shown in FIG. 5, at 502, system 100 determines a job initiated by a virtual machine, wherein the job requests to invoke at least one virtual function in a set of virtual functions associated with the virtual machine, and each virtual function in the set of virtual functions is configured to utilize an accelerator resource to provide a single type of acceleration service.

Taking FIG. 3 as an example, system 100 may determine, for example, that virtual machine 330 initiates a "data backup" job that requests to invoke acceleration services provided by VF 320-1, VF 320-4, and VF 320-5.

At 504, system 100 determines, based on a job type of the job, a first accelerator resource allocated to the at least one virtual function.

As discussed above, system 100 may implement dynamic scheduling of accelerator resources among virtual machines and/or dynamic scheduling of accelerator resources among virtual functions based on the job types.

In one or more embodiments, system 100 may determine a second accelerator resource allocated to the virtual machine.

Specifically, system 100 may determine a first scheduling policy based on the job type, the first scheduling policy indicating a scheme for scheduling accelerator resources among different virtual machines. For example, system 100 may determine the first scheduling policy based on the job type of the job performed by virtual machine 330 being "data backup" and the job type of the job performed by virtual machine 350 being "garbage collection".

Further, system 100 may determine, based on the first scheduling policy, the second accelerator resource allocated to the virtual machine. For example, as discussed above, system 100 may allocate more accelerator resources to virtual machine 330 and fewer accelerator resources to virtual machine 350.

In one or more embodiments, the system may also determine, based on the second accelerator resource, the first accelerator resource allocated to the at least one virtual function.

Specifically, system 100 may determine a second scheduling policy based on the job type, wherein the second scheduling policy indicates a scheme for scheduling resources among the set of virtual functions. For example, system 100 may determine the policy for allocating accelerator resources among VF 320-1, VF 320-4, and VF 320-5 based on the job type of the job performed by virtual machine 330 being "data backup."

Further, the system may determine, based on the second scheduling policy, the accelerator resources allocated to each of the at least one virtual function. For example, as discussed above, system 100 may provide more accelerator resources to virtual service (VF) 320-4 that is used to provide a hashing service.

In one or more embodiments, the system may also allocate the first accelerator resources to the at least one virtual function with the service level agreement (SLA). As discussed above with reference to FIG. 4, the system may perform the allocation of accelerator resources to each VF with the SLA agreement.

In one or more embodiments, the job type includes at least one of: a job type for data backup, a job type for data recovery, a job type for data copy, or a job type for garbage collection.

In one or more embodiments, the single type of acceleration service includes one of: a compression service, an encryption service, a decryption service, a hashing service, or a decompression service.

In one or more embodiments, the accelerator resource is one or more Quick Assist Technology (QAT) cards.

Figure 6:
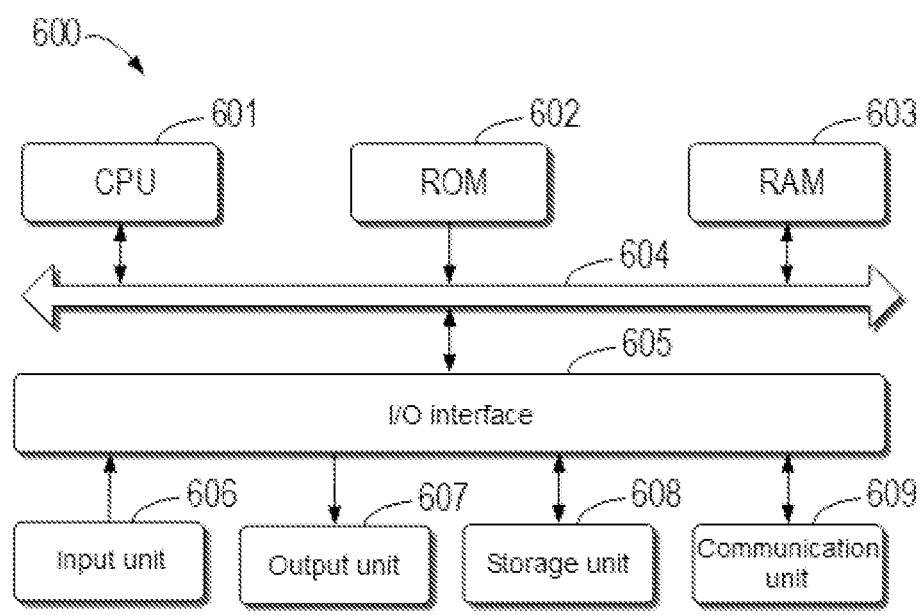
FIG. 6 illustrates a block diagram of an example device that can be used to implement one or more of the embodiments of the present disclosure.

FIG. 6 illustrates a schematic block diagram of example device 600 that may be used to implement one or more embodiments of the present disclosure. For example, system 100 and/or system 400 according to one or more embodiments of the present disclosure may be implemented by device 600. As shown in the figure, device 600 includes central processing unit (CPU) 601 that may perform various appropriate actions and processing according to computer program instructions stored in read-only memory (ROM) 602 or computer program instructions loaded from storage unit 608 to random access memory (RAM) 603. In RAM 603, various programs and data required for the operation of device 600 may also be stored. CPU 601, ROM 602, and RAM 603 are connected to each other through bus 604. Input/output (I/O) interface 605 is also connected to bus 604.

Multiple components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various processes and processing described above, such as process 500, may be executed by processing unit 601. For example, in one or more embodiments, process 500 may be implemented as a computer software program that is tangibly included in a machine-readable medium, for example, storage unit 608. In one or more embodiments, part or all of the computer program may be loaded and/or installed onto device 600 via ROM 602 and/or communication unit 609. When the computer program is loaded into RAM 603 and executed by CPU 601, one or more actions of process 500 described above may be implemented.

Embodiments of the present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, including object oriented programming languages, such as Smalltalk, C++, and the like and conventional procedural programming languages, such as the "C" language or similar programming languages. The computer-readable program instructions may be executed entirely on a user computer, or partly on a user computer, or as a stand-alone software package, or partly on a user computer and partly on a remote computer, or entirely on a remote computer or server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product implemented according to the embodiments of the present disclosure. It should be understood that each block of the flow charts and/or the block diagrams and combinations of blocks in the flow charts and/or the block diagrams may be implemented by the computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various implementations of the present disclosure have been described above. The foregoing description is illustrative rather than exhaustive, and is not limited to the disclosed implementations. Numerous modifications and alterations are apparent to persons of ordinary skill in the art without departing from the scope and spirit of the illustrated implementations. The selection of terms used herein is intended to best explain the principles and practical applications of the implementations or the improvements to technologies on the market, or to enable other persons of ordinary skill in the art to understand the implementations disclosed herein.

The invention claimed is:

1. A method for resource scheduling, comprising:
   identifying a job initiated by a virtual machine, wherein the job requests to invoke at least one virtual function of a set of virtual functions associated with the virtual machine, and each virtual function of the set of virtual functions utilizes an accelerator resource to provide a single type of acceleration service of a set of accelerator services to the virtual machine, wherein the set of acceleration services comprises at least one of: an encryption service, a decryption service, a hashing service, a compression service, or a decompression service, wherein each virtual function is exclusively associated with a single type of accelerator service of the set of accelerator services;
   determining, based on a job type of the identified job, a first accelerator resource allocated to the at least one virtual function, wherein the determining comprises:
      determining a first scheduling policy based on the job type, wherein the first scheduling policy indicating a first scheme for scheduling accelerator resources among different virtual machines, wherein the first scheduling policy is generated using a machine learning model, wherein the machine learning model is trained using features corresponding to scenarios and features related to job types as an input, and accelerator resource allocation rules constructed as testing data;
      determining, based on the first scheduling policy, a second accelerator resource currently allocated to the virtual machine;
      determining, based on the second accelerator resource, the first accelerator resource currently allocated to the at least one virtual function; and
   performing the identified job, invoking the at least one virtual function, using the first accelerator resource.

2. The method according to claim 1, wherein determining, based on the second accelerator resource, the first accelerator resource currently allocated to the at least one virtual function comprises:
   determining a second scheduling policy based on the job type, the second scheduling policy indicating a second scheme for scheduling resources among the set of virtual functions; and
   determining, based on the second scheduling policy, the accelerator resource currently allocated to each of the virtual functions of the set of virtual functions.

3. The method according to claim 1, further comprising:
allocating the first accelerator resource to the at least one virtual function with a service level agreement (SLA).

4. The method according to claim 1, wherein the job type comprises at least one of: a job type for data backup, a job type for data recovery, a job type for data copy, or a job type for garbage collection.

5. The method according to claim 1, wherein the accelerator resource is one or more Quick Assist Technology (QAT) cards.

6. An electronic device, comprising:
   at least one processing unit; and
   at least one memory coupled to the at least one processing unit and storing instructions for execution by the at least one processing unit, wherein the instructions, when executed by the at least one processing unit, cause the electronic device to perform actions comprising:
      identifying a job initiated by a virtual machine, wherein the job requests to invoke at least one virtual function of a set of virtual functions associated with the virtual machine, and each virtual function of the set of virtual functions utilizes an accelerator resource to provide a single type of acceleration service of a set of accelerator services to the virtual machine, wherein the set of acceleration services comprises at least one of: an encryption service, a decryption service, a hashing service, a compression service, or a decompression service, wherein each virtual function is exclusively associated with a single type of accelerator service of the set of accelerator services;
      determining, based on a job type of the identified job, a first accelerator resource allocated to the at least one virtual function, wherein the determining comprises:
         determining a first scheduling policy based on the job type, wherein the first scheduling policy indicating a first scheme for scheduling accelerator resources among different virtual machines, wherein the first scheduling policy is generated using a machine learning model, wherein the machine learning model is trained using features corresponding to scenarios and features related to job types as an input, and accelerator resource allocation rules constructed as testing data;
         determining, based on the first scheduling policy, a second accelerator resource currently allocated to the virtual machine;
         determining, based on the second accelerator resource, the first accelerator resource currently allocated to the at least one virtual function; and
      performing the identified job, invoking the at least one virtual function, using the first accelerator resource.

7. The electronic device according to claim 6, wherein determining, based on the second accelerator resource, the first accelerator resource currently allocated to the at least one virtual function comprises:
   determining a second scheduling policy based on the job type, the second scheduling policy indicating a second scheme for scheduling resources among the set of virtual functions; and
   determining, based on the second scheduling policy, the accelerator resource currently allocated to each of the virtual functions of the set of virtual functions.

8. The electronic device according to claim 6, wherein the actions further comprise:
   allocating the first accelerator resource to the at least one virtual function with a service level agreement (SLA).

9. The electronic device according to claim 6, wherein the job type comprises at least one of: a job type for data backup, a job type for data recovery, a job type for data copy, or a job type for garbage collection.

10. The electronic device according to claim 6, wherein the accelerator resource is one or more Quick Assist Technology (QAT) cards.

11. A non-transitory computer readable medium comprising computer readable program code, which when executed by a computer processor, enables the computer processor to:
    identifying a job initiated by a virtual machine, wherein the job requests to invoke at least one virtual function of a set of virtual functions associated with the virtual machine, and each virtual function of the set of virtual functions utilizes an accelerator resource to provide a single type of acceleration service of a set of accelerator services to the virtual machine, wherein the set of acceleration services comprises at least one of: an encryption service, a decryption service, a hashing service, a compression service, or a decompression service, wherein each virtual function is exclusively associated with a single type of accelerator service of the set of accelerator services;
    determining, based on a job type of the identified job, a first accelerator resource allocated to the at least one virtual function, wherein the determining comprises:
        determining a first scheduling policy based on the job type, wherein the first scheduling policy indicating a first scheme for scheduling accelerator resources among different virtual machines, wherein the first scheduling policy is generated using a machine learning model, wherein the machine learning model is trained using features corresponding to scenarios and features related to job types as an input, and accelerator resource allocation rules constructed as testing data;
        determining, based on the first scheduling policy, a second accelerator resource currently allocated to the virtual machine;
        determining, based on the second accelerator resource, the first accelerator resource currently allocated to the at least one virtual function; and
    performing the identified job, invoking the at least one virtual function, using the first accelerator resource.

12. The computer-readable medium according to claim 11, wherein determining, based on the second accelerator resource, the first accelerator resource currently allocated to the at least one virtual function comprises:
    determining a second scheduling policy based on the job type, the second scheduling policy indicating a second scheme for scheduling resources among the set of virtual functions; and
    determining, based on the second scheduling policy, the accelerator resource currently allocated to each of the virtual functions of the set of virtual functions.

* * * * *